United States Patent
Hwang et al.

(10) Patent No.: US 11,821,756 B2
(45) Date of Patent: Nov. 21, 2023

(54) METHOD OF MEASURING SLOPE OF DRAINPIPE

(71) Applicants: NUVOTEC CO., LTD., Wonju-si (KR); BLUEFOX SYSTEMS INC., Seoul (KR)

(72) Inventors: Mun-Gi Hwang, Wonju-si (KR); Jum-Ok Park, Incheon (KR); Gyu-Hong Jo, Bucheon-si (KR); Joon-Ha Park, Yongin-si (KR); Jae-Hyun Lee, Gunpo-si (KR); Sung-Soo Yoon, Seoul (KR)

(73) Assignees: NUVOTEC CO., LTD., Wonju-si (KR); BLUEFOX SYSTEMS INC., Seoul (KR)

( * ) Notice: Subject to any disclaimer, the term of this patent is extended or adjusted under 35 U.S.C. 154(b) by 539 days.

(21) Appl. No.: 17/251,176

(22) PCT Filed: Nov. 6, 2019

(86) PCT No.: PCT/KR2019/014979
§ 371 (c)(1),
(2) Date: Dec. 10, 2020

(87) PCT Pub. No.: WO2021/090977
PCT Pub. Date: May 14, 2021

(65) Prior Publication Data
US 2021/0372792 A1    Dec. 2, 2021

(30) Foreign Application Priority Data
Nov. 6, 2019 (KR) .................. 10-2019-0140900

(51) Int. Cl.
*G01C 9/06* (2006.01)
*F16L 55/32* (2006.01)
(Continued)

(52) U.S. Cl.
CPC ............ *G01C 9/06* (2013.01); *F16L 55/32* (2013.01); *G01C 11/02* (2013.01); *G01C 11/04* (2013.01);
(Continued)

(58) Field of Classification Search
CPC .......... G01C 9/06; G01C 11/02; G01C 11/04; G01C 2009/066; F16L 55/32; F16L 2101/30; E03F 3/06
(Continued)

(56) References Cited

U.S. PATENT DOCUMENTS

| | | | |
|---|---|---|---|
| 2007/0246116 A1* | 10/2007 | Peak | E03C 1/122 138/104 |
| 2014/0137419 A1* | 5/2014 | Webb | G01C 9/26 33/301 |

FOREIGN PATENT DOCUMENTS

KR       10-0977051 B1    8/2010

* cited by examiner

*Primary Examiner* — Aditya S Bhat
(74) *Attorney, Agent, or Firm* — ArentFox Schiff LLP

(57) ABSTRACT

Proposed is a method of measuring the slope of a drainpipe while moving through the drainpipe. The method includes following steps: a) continuously measuring a slope of a pipe using a slope sensor disposed in a vehicle when the vehicle moves; b) measuring distances to a ceiling of the pipe in real time through non-contact sensors disposed at four positions, that is, at both sides of front and rear portions the vehicle, the step b) being performed simultaneously with the step a); and c) calculating slope differences, which are the degrees of inclination to the front, rear, left, and right using trigonometry and then correcting the slope by reflecting the slope differences to the slope measured in the step a), when there are differences in the distances measured in step b).

5 Claims, 6 Drawing Sheets

(51) Int. Cl.
*G01C 11/02* (2006.01)
*G01C 11/04* (2006.01)
*E03F 3/06* (2006.01)
*F16L 101/30* (2006.01)

(52) U.S. Cl.
CPC .............. *E03F 3/06* (2013.01); *F16L 2101/30* (2013.01); *G01C 2009/066* (2013.01)

(58) Field of Classification Search
USPC ........................................................ 702/154
See application file for complete search history.

[FIG. 1]
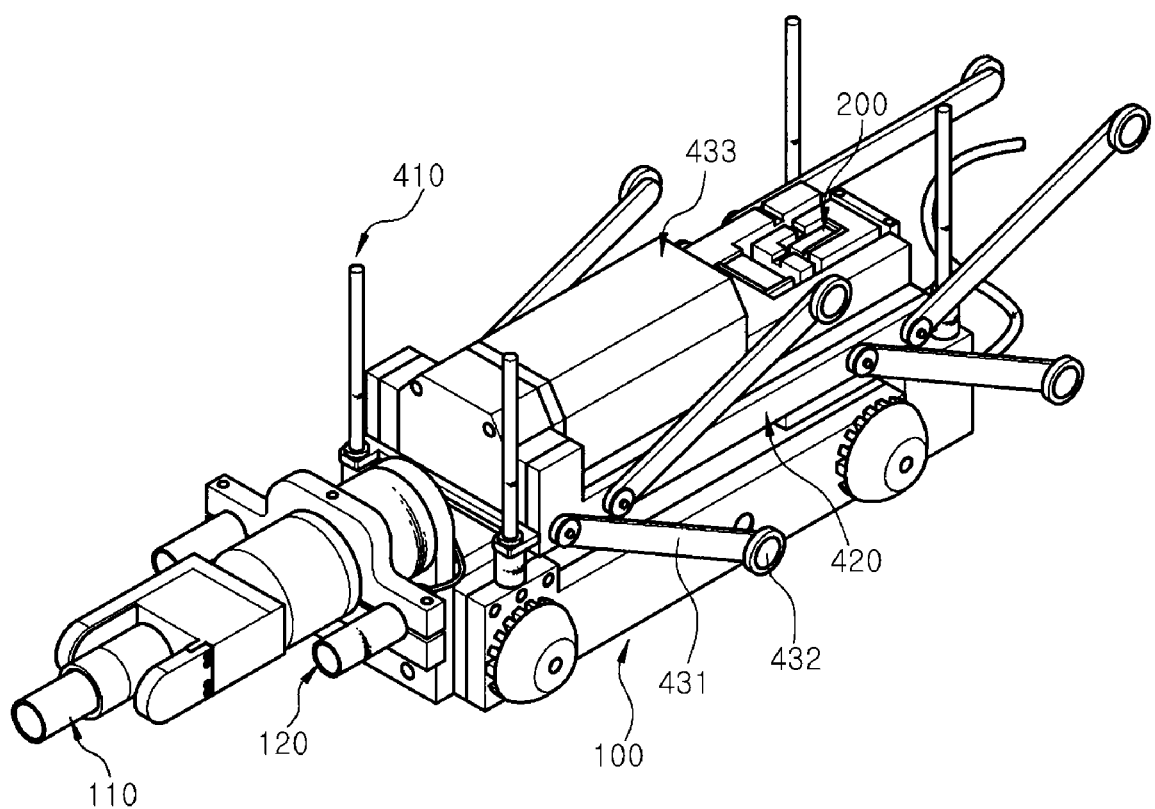

[FIG. 2]
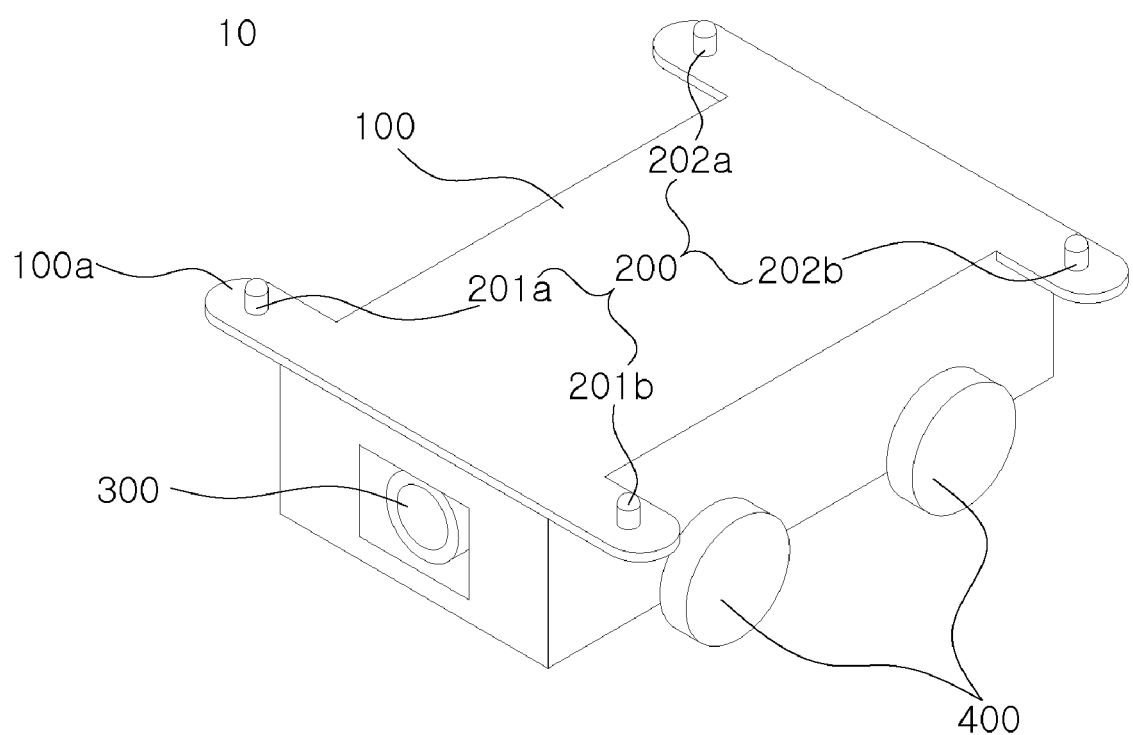

[FIG. 3]
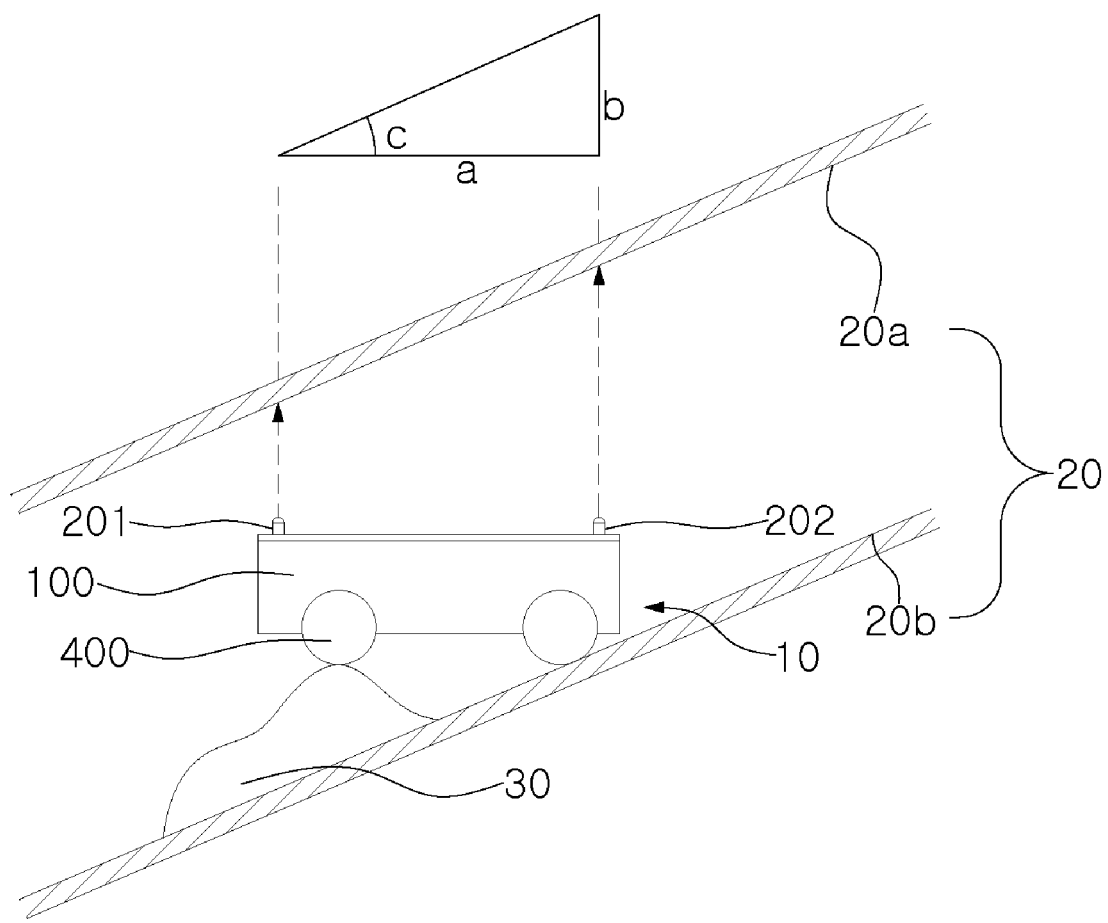

[FIG. 4]
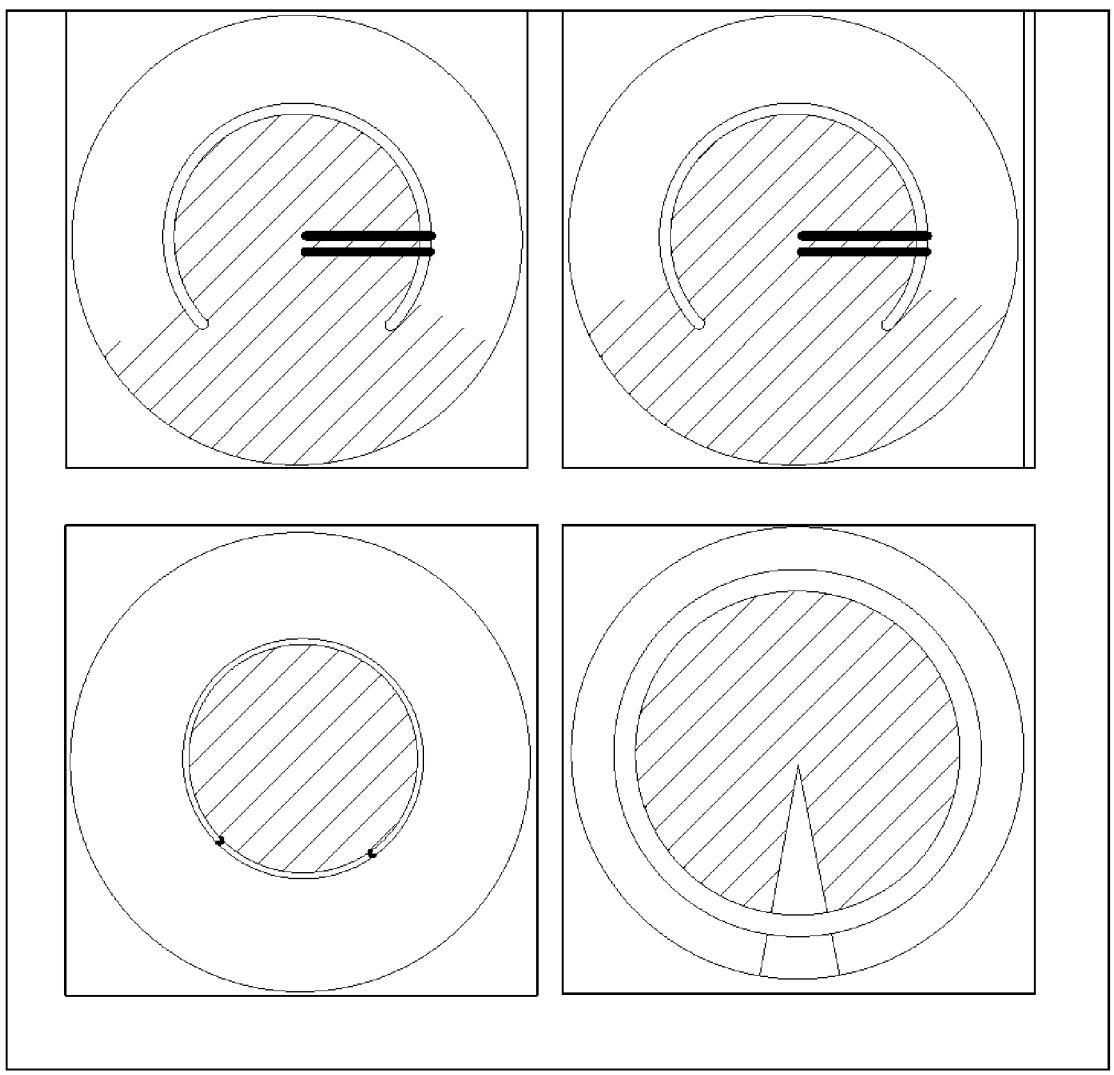

[FIG. 5a]
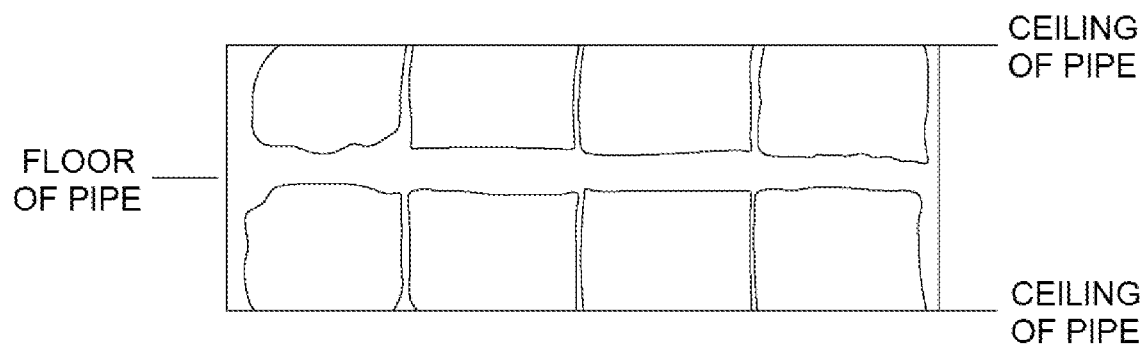
FLOOR OF PIPE
CEILING OF PIPE
CEILING OF PIPE
[FIG. 5b]
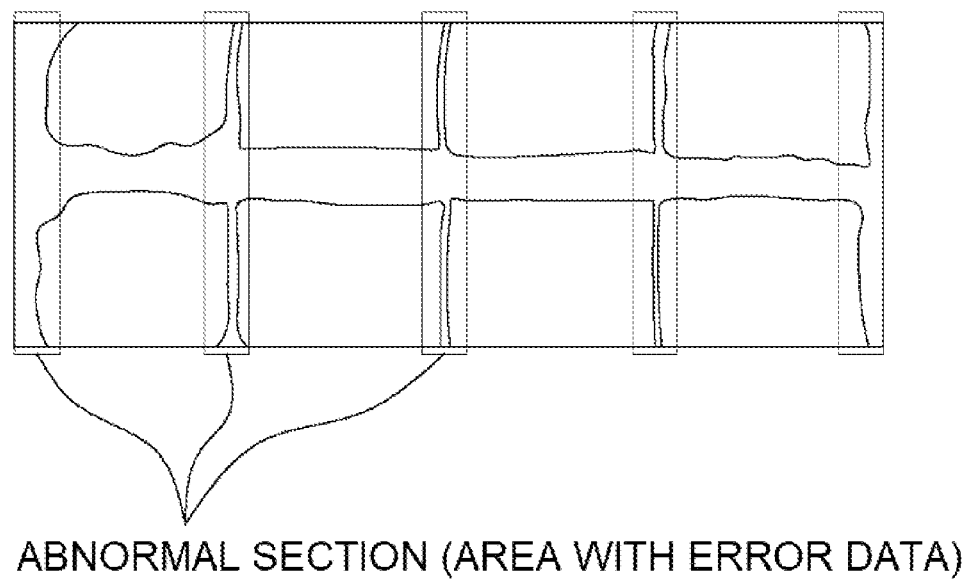
ABNORMAL SECTION (AREA WITH ERROR DATA)

[FIG. 6]
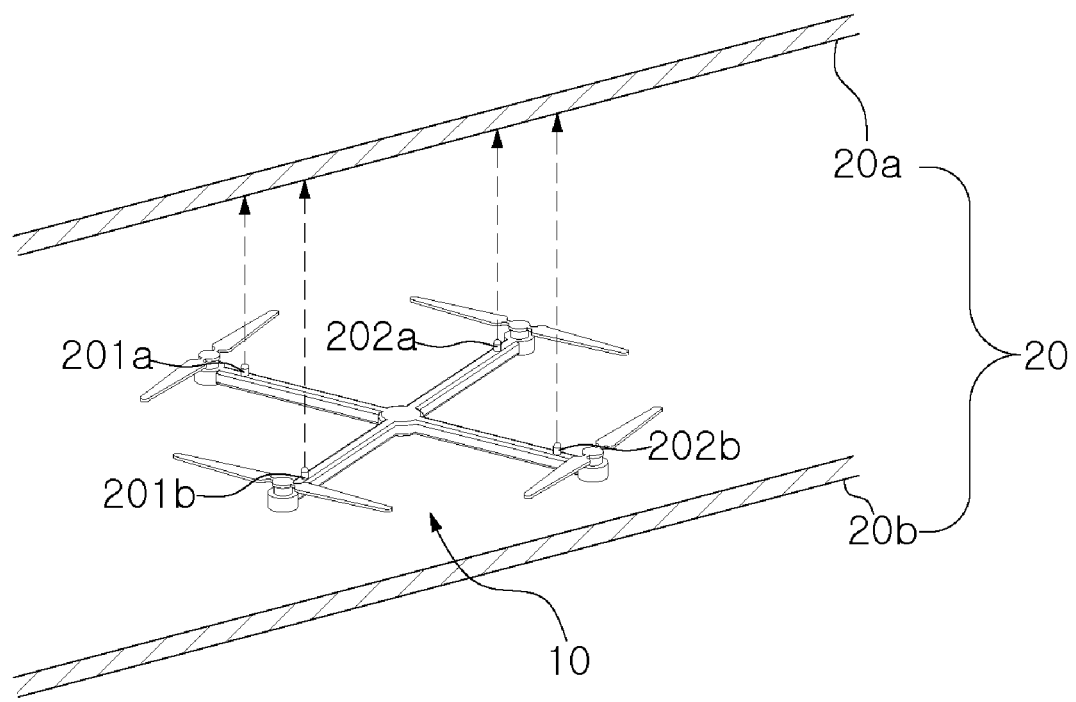

METHOD OF MEASURING SLOPE OF DRAINPIPE

CROSS-REFERENCE TO RELATED APPLICATION

This application is a 371 U.S. national stage of PCT/KR2019/014979, filed Nov. 6, 2019, which claims the benefit of Korean Patent Application No. 10-2019-0140900 filed Nov. 6, 2019 and the contents of each of which are incorporated herein by reference.

TECHNICAL FIELD

The present disclosure relates to a method of measuring the slope of a drainpipe and, more particularly, to a method of measuring the slope of a drainpipe, the method being able to accurately measure the slope of not only a newly installed drainpipe and a good-condition drainpipe, but also a severely deformed or damaged drainpipe.

BACKGROUND ART

In general, the drainpipe, unlike the water pipe, has a structure in which sewage is dropped by gravity and flows out, so the slope of the drainpipe is very important. If an adverse slope is made due to a change of the slope of a drainpipe when the drainpipe is installed, sewage collects in a portion of the drainpipe, which causes corrosion and sinking of the drainpipe.

In general, the inside of drainpipes has a circular pipe structure and a large amount of dirt such as sludge is contained in sewage including wastewater or rainwater, so it is difficult to measure the accurate slope of the inside of drainpipes.

Recently, self-propelled vehicle type slope measurement apparatuses that collect measurement values of a slope while moving in a drainpipe have been developed and used to measure the accurate slope of the inside of drainpipes.

An example of such self-propelled vehicle type slope measurement apparatuses has been disclosed in detail in Korean Patent No. 0977051 (hereafter, referred to as a 'prior art document').

Referring to FIG. 1, the self-propelled vehicle type slope measurement apparatus disclosed in the prior art document includes a self-propelled vehicle body, a sensor unit, a control board, a sensor position guide unit, a sensor angle compensation unit, etc.

A camera 110 and lights 120 are mounted on the self-propelled vehicle body 100 and the sensor unit 200 is mounted on the self-propelled vehicle to measure the deformation amount and the slope of a pipe.

A pipe deformation amount measurement sensor of the sensor unit 200 measures the deformation amount in the radial direction of a drainpipe P using ultrasonic waves. A pipe slope measurement sensor may include a first slope measurement sensor that measures the pipe slope in the longitudinal direction (Y-axial direction) of the drainpipe P and a second slope measurement sensor that measures the slope of the self-propelled vehicle in the radial direction (X-axial direction) of the drainpipe P.

The sensor position guide unit guides the position of the sensor unit 200 such that the sensor unit 200 is positioned at the center of the pipe P when the self-propelled vehicle is driven in the pipe P. The sensor position guide unit includes a ball bush 410, an elevation plate 420, an elevation guide, etc., and the elevation guide is composed of a guide rod 431, a guide roller 432, and a driver 433.

However, according to the method of measuring a slope using the self-propelled vehicle type having this configuration in the related art, since sensors are fundamentally mounted on the self-propelled vehicle that is driven with wheels in contact with the floor of a drainpipe, there is a fundamental problem that it is difficult to drive the self-propelled vehicle when there is an obstacle on the floor of the drainpipe such as sludge in sewage or branches in rainwater, and particularly, the accuracy in slope measurement is unavoidably greatly decreased.

A method of measuring the slope of the ceiling of a drainpipe has been proposed to increase the accuracy when measuring the slope of the floor, but it is still difficult to drive a self-propelled vehicle due to obstacles on the floor, it is also still difficult to measure the slope of the ceiling when there are various obstacles stuck on the ceiling of a drainpipe, and the reliability of the measured data is low, so using this method is impractical yet.

Accordingly, according to the method of measuring a slope using a self-propelled vehicle type in the related art, since it is required to measure a slope while driving on the floor of a drainpipe, there is a lot of noise in the collected data, so the reliability is unavoidably low. Further, when there is a flat obstacle formed on the floor in a drainpipe due to deposition of a small amount of sewage sludge, etc., it is difficult to discriminate the fundamental horizontal posture control of a self-propelled vehicle and posture control due to an obstacle, so there is still high possibility of a data error due to obtaining the horizontal inclination rather than the slope of the pipe. Accordingly, problems to be solved still remain.

DISCLOSURE

Technical Problem

The present disclosure has been made in an effort to solve the problems described above and an objective of the present disclosure is to provide a method of measuring the slope of a drainpipe. The method fundamentally measures the slope of the ceiling of a drainpipe using non-contact sensors disposed at four positions, that is, the front, rear, left, and right on the body of an apparatus, corrects vertical and horizontal slope distortion due to an obstacle on the floor, and filters out noise data, thereby providing considerably high accuracy in comparison to the self-propelled type of the related art.

Technical Solution

In order to achieve the objectives of the present disclosure, an embodiment of the present disclosure provides a method of measuring the slope of a drainpipe while moving through the drainpipe, the method including the following steps: a) continuously measuring a slope of a pipe using a slope sensor disposed in a vehicle when the vehicle moves; b) measuring distances to a ceiling of the pipe in real time through non-contact sensors disposed at four positions, that is, at both sides of front and rear portions the vehicle, the step b) being performed simultaneously with the step a); and c) calculating slope differences, which are the degrees of inclination to the front, rear, left, and right using trigonometry and then correcting the slope by reflecting the slope differences to the slope measured in the step a), when there are differences in the distances measured in step b).

The method may further include the following steps: d1) continuously taking images of an inside of the pipe using a camera on the vehicle and determining whether a shadow of a center of the pipe is a circle or not in an image frame in the taken image information using a image recognition technique, the step d1) being performed simultaneously with the step a); and d2) filtering out the slope measured at the point corresponding to a non-circle in step a) from entire slope data when it is determined that the shadow of the center of the pipe is not a circle in step d1).

The images continuously taken in the step d1) may be converted into a gray scale and then whether the shadow of the center of the pipe is a circle in an image frame of the gray scale may be determined.

The method may further include the following steps: e1) continuously taking images of the inside of the pipe using a camera on the vehicle, creating a panorama image by spreading the obtained image information on a plane using an image recognition technique, and then calculating an average RGB density of the panorama image, the step e1) being performed simultaneously with the step a); e2) searching out specific sections of which the RGB densities exceed a predetermined range from the average RGB density of the entire image from the panorama image created in step e1); and e3) when an abnormal section is found in step e2), filtering out the slope measured at the point corresponding to the abnormal section in step a) from entire effective slope data.

The vehicle may be a self-propelled vehicle that is driven by wheels, or a drone.

Advantageous Effects

According to the present disclosure, by fundamentally measuring the slope of the ceiling of a drainpipe using non-contact sensors disposed at four positions, that is, at both sides of front and rear portions of the body of an apparatus, and by correcting in real time slope distortion due to vertical and horizontal slope distortion by an obstacle on the floor in the pipe, it is possible to obtain accurate slope data even without using a complicated device for maintaining the posture of a self-propelled vehicle or a sensor in comparison to the method of measuring a slope using a self-propelled vehicle in the related art.

Further, when collecting slope data of a predetermined section, by continuously taking images of the inside of a pipe and selectively filtering abnormal noise data due to corrosion of surface detachment of the ceiling of the pipe through multiple steps, it is possible to remarkably improve the accuracy of slope data in comparison to the method of measuring a slope using a self-propelled vehicle in the related art.

Further, since the present disclosure can be applied to a drone, it is possible to more quickly and accurately measure a slope in comparison to the method using a self-propelled vehicle in the related art. In particular, it is possible to search a vertical descending section or a vertical ascending section of a drainpipe that is difficult for a self-propelled vehicle moved by wheels to approach in the related art while moving through the vertical descending section or the vertical ascending section. Accordingly, the present disclosure can contribute to developing next-generation drone-type technology.

DESCRIPTION OF DRAWINGS

FIG. 1 is a view showing a self-propelled vehicle type drainpipe measurement apparatus of the related art;

FIG. 2 is an exemplary view showing an embodiment of an apparatus for measuring the slope of a drainpipe according to the present disclosure;

FIG. 3 is a view showing the operation state when the apparatus shown in FIG. 2 is actually put into a drainpipe;

FIG. 4 shows captured images showing an example of a first filtering process according to the present disclosure;

FIGS. 5a and 5b show captured images illustrating an example of a second filtering process according to the present disclosure, in which FIG. 5a shows an example of an image after a panorama image conversion and FIG. 5b shows an example of an image searching out abnormal areas; and FIG. 6 is an exemplary view showing another embodiment of an apparatus for measuring the slope of a drainpipe according to the present disclosure.

BEST MODE

Terms used in this specification are used only in order to describe specific exemplary embodiments rather than limiting the present disclosure. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present disclosure belongs.

It must be understood that the terms defined by the dictionary are identical with the meanings within the context of the related art, and they should not be ideally or excessively formally defined unless the context clearly dictates otherwise.

Hereafter, the configuration and the operation relationship of an apparatus for measuring the slope of a drainpipe according to the present disclosure are described in detail with reference to the accompanying drawings.

FIG. 2 is an exemplary view showing an embodiment of an apparatus for measuring the slope of a drainpipe according to the present disclosure. Referring to FIG. 2, a vehicle of the apparatus for measuring the slope of a drainpipe according to the present disclosure may be a self-propelled vehicle that is moved by wheels.

The vehicle 10 is usually driven on the floor 20b of a drainpipe 20 by the operation of 4 wheels and a slope sensor (not shown), for example, a gyro sensor is fundamentally disposed in an oblong body 100, thereby measuring the slope of the drainpipe 20 in real time on the basis of the inclination of the oblong body 100.

Protrusions 100a are formed at four positions, that is, at both sides of the front and rear portions of the oblong body 100 and non-contact sensors 200 are disposed at the protrusions 100a, respectively, in which the non-contact sensors 200, for example, may be ultrasonic or laser distance sensors.

The non-contact sensors 200 are installed to radiate light upward, that is, to the ceiling 20a of the drainpipe 20, whereby the non-contact sensors 200 each measure in real time the distance to the ceiling 20a of the drainpipe.

A camera 300 is disposed on the front of the body 100, thereby continuously taking images of the inside of the drainpipe 20 when the vehicle 10 moves through the drainpipe 20.

FIG. 3 is a view showing the operation state when the apparatus shown in FIG. 2 is practically put into a drainpipe. Hereafter, a method of measuring the slope of a drainpipe of the present disclosure is described with reference to FIG. 3.

First, in step a), when the vehicle 10 moves, a slope sensor (not shown) disposed in the vehicle continuously measures the slope of a pipe.

That is, when the vehicle 10 moves through the drainpipe 20, the slope sensor continuously measures the slope. In this process, if there is no obstacle on the floor 20b of the drainpipe, the inclination of the oblong body 100 and the inclination angle of the drainpipe 20 that are measured by the slope sensor (not shown) are the same.

In step b), which is performed simultaneously with step a), the non-contact sensors 200 disposed at four positions, that is, at both sides of the front and rear portions of the vehicle 10 each measure the distance to the ceiling 20a of the pipe in real time.

That is, the slope sensor (not shown) continuously measures the inclination angle of the drainpipe 20 in step a), and simultaneously, the four non-contact sensors 200 also measure the distances to four upper points at the front, rear, left, and right on the ceiling 20a of the drainpipe in real time.

In this process, if there is no obstacle on the floor 20b of the drainpipe, it would be understood that the distances to the four points on the ceiling 20a measured by the non-contact sensors 200 are also the same.

Next, in step c), when there is a difference in the distances measured in step b), slope differences that are the degrees of inclination to the front, rear, left, and right are calculated using trigonometry, and then the slope differences are reflected to the slope measured in step a), thereby correcting the slope.

According to a drainpipe that passes sewage or rainwater by gravity, a lot of various obstacles such as sludge in the sewage or branches in the rainwater usually exist on the floor of the drainpipe for the features thereof.

Accordingly, when there is an obstacle 30 on the floor 20b of a drainpipe, as shown in FIG. 3, the body 100 of the vehicle 10 is lifted by the obstacle 30, and in this case, the distances to four points measured by the non-contact sensors 200 are changed.

As described above, when the distances to four points change, the changed slope differences are calculated through trigonometry, and then, the actual resultant inclination angle is calculated through correction of adding or subtracting the slope differences calculated by the non-contact sensors 20 to or from the inclination angle of the drainpipe 20 measured in step a).

This process is described in more detail with reference to a virtual triangle constructed by connecting points that the non-contact sensors face, as shown in FIG. 3. The distance 'a' is the fixed distance between the front sensors 201a and 201b and the rear sensors 202a and 202b and the distance 'b' is the difference between the distance measured by the front sensors 201a and 201b and the distance measured by the rear sensors 202a and 202b.

Accordingly, when the distances 'a' and 'b' are calculated, the slope difference 'c' can also be calculated through trigonometry. Further, it is possible to accurately calculate the actual resultant slope of the drainpipe 20 by performing correction of adding or subtracting the slope difference 'c' to or from the slope measured by the slope sensor (not shown).

FIG. 4 shows captured images showing an example of a first filtering process according to the present disclosure.

On the other hand, not only there is the obstacle 30 on the floor in the drainpipe 20, as described above, but also there may be various obstacles on the ceiling 20a of the drainpipe 20.

For example, the obstacles on the ceiling 20a may be corrosion or deformation of the inner wall of the drainpipe 20 or other obstacles, which may cause an error that decreases the accuracy of the actually measured slope by influencing the slope differences measured by the non-contact sensors 200.

Accordingly, the method of the present disclosure may further include a first filtering process for increasing the accuracy of data by excluding errors due to obstacles.

The first filtering process of the present disclosure is described hereafter with reference to FIG. 4.

The first filtering process, which is performed simultaneously with step a), continuously takes images of the inside of the pipe 20 using the camera 300 on the vehicle 10 and determines whether the shadow of the center of the pipe 20 is a circle or not in the image frame in the taken image information using so-called a 'image recognition technique'; step d1).

The images may be obtained for each from, for example, in the formation of JPEG. Assuming that the vehicle 10 moves about 0.3 m per second, three images are obtained for every second at every 0.1 m.

Next, in step d2), when it is determined that the shadow of the center of the pipe is not a circle in step d1), the slope measured at a point corresponding to the non-circle in step a) is filtered out from the entire slope data.

A step of converting the continuously obtained images into a gray scale and then determining whether the shadow of the center of the pipe is a circle or not in the converted gray scale image frame may be further included between step d1) and step d2).

The shadow at the center inside the pipe can be more clearly shown, as shown in FIG. 4, by reducing the brightness and the illumination of the images converted into the gray scale.

Accordingly, a controller (not shown) determines the shadow image inside the pipe is close to a circle through a common 'image recognition technique'. If it is determined that the shadow image is not close to a circle, the slope measured at the point corresponding to the shadow image determined as not being close to a circle is filtered out from the entire effective data.

The actual effective data are obtained, for example, by continuously measuring the slope through a 50 m section in a drainpipe. In this case, it is possible to increase the accuracy of the entire effective data by filtering out the slopes measured at points where the shadow is not close to a circle, that is, the ineffective slopes measured at points recognize as errors from the entire effective data.

Meanwhile, the point for determining whether the shadow is a circle or not in the image is about a point at 0.9 m ahead from the vehicle 10. Accordingly, after it is determined whether the shadow is a circle and a value is not effective due to an upper obstacle the basis of the image, and when the vehicle 10 moves to the point in about 3 seconds and then the actual slope is measured at the point, the actually measured slope is filtered (that is, there is a first filtering-standby time of about 3 seconds).

The image that is taken by the camera 300 and the distances to the ceiling 20a of the pipe that are measured by the non-contact sensors 20 on the vehicle 10 may change, depending on the diameter of the pipe and the size and driving speed of the vehicle. However, when the size of the vehicle 10 is determined, it is possible to derive the accurate filtering-standby time, so it is possible to selectively secure only accurate effect data.

FIGS. 5a and 5b show captured images illustrating an example of a second filtering process according to the present disclosure, in which FIG. 5a shows an example of an image after a panorama image conversion and FIG. 5b shows an example of an image searching out abnormal areas.

Although it is possible to filter out relatively large obstacles on the ceiling 20a of the drainpipe through the first filtering process, it is difficult to exclude relatively small obstacles such as corrosion or detachment of the inner surface of the drainpipe 20 through the first filtering process.

Accordingly, a second filtering process to be described below may be further performed with the first filtering process to further increase the accuracy of data.

First, referring to FIG. 5a, the second filtering process, in step e1), continuously takes images of the inside of the pipe 20 using the camera 300 on the vehicle, creates a panorama image by spreading the taken image information on a plane using the 'image recognition technique', and then calculates the average RGB density of the panorama image.

That is, step e1) uses the 'image recognition technique', but shows the entire inner surface of the drainpipe by spreading the continuously taken images into a continuous plane image, for example, a panorama image. Next, the average RGB density of the panorama image is calculated.

Next, referring to FIG. 5b, in step e2), specific sections of which the RGB densities exceed a predetermined range from the average RGB density of the entire image are found from the panorama image created in step e1).

That is, the entire plane image is divided into sectional frames and whether there is surface detachment is checked for every section through a 'color discrimination technique'. For example, the entire plane image is divided into sectional image frames with intervals of 0.1 m. Next, the RGB densities of the sections are measured through the color discrimination technique and then are compared with the average RGB density of the entire panorama image. Thereafter, when there are sections of which the RGB densities exceed a predetermined level from average RGB density, the sections are determined as abnormal sections.

In step e3), when an abnormal section is found in step e2), the slope measured at the point corresponding to the abnormal section filtered out from the entire effective slope data.

That is, second filtering is completed by extracting the slope measured at the point corresponding to the abnormal section found in step e2) from the entire effective slope data. Accordingly, the possibility that may cause a slope error due to a relatively small obstacle such as surface detachment is removed, thereby being able to further improve the accuracy of the slope data.

FIG. 6 is an exemplary view showing another embodiment of an apparatus for measuring the slope of a drainpipe according to the present disclosure.

Referring to FIG. 6, the vehicle 10 of the apparatus for measuring the slope of the drainpipe 20 according to the present disclosure may be a drone that flies in the drainpipe 20.

A total of four front sensors 201a and 201b and rear sensors 202a and 202b, similar to the self-propelled vehicle described above, are respectively disposed on the wings of the drone 10.

Accordingly, when the vehicle 10 is a drone, a slope sensor (not shown) disposed in the drone 10 measures the inclination angle of the drone 10 while the drone 10 flies through the drainpipe 20 in the same way as the self-propelled vehicle in the above embodiment.

Four non-contact sensors 200, that is, front sensors 201a and 201b and rear sensor 202a and 202b are mounted on the wings of the drone 10 and measures distances by radiating ultrasonic waves or a laser to the ceiling of the drainpipe. Accordingly, it is possible to obtain an accurate inclination angle by correcting an inclination angle by applying trigonometry to the measured distances.

Accordingly, since the drone 10 is never influenced by obstacles such as sewage sludge in the drainpipe 20, particularly, on the floor 20b while moving, it can quickly measure the slope of the drainpipe 20, so it is possible to remarkably reduce the work time for measurement. Further, it is possible to measure the slope while easily moving through a vertical descending section or a vertical ascending section of the drainpipe 20 that is difficult for a self-propelled vehicle moved by wheels to approach in the related art. Therefore, it is expected that the technology will rapidly change to such a next-generation drone-type measurement apparatus in the future.

The present disclosure is not limited only to the embodiments described above and the same effect can be achieved even if the detailed configuration, the number of parts, and the arrangement structure are changed. Accordingly, it should be understood that various configurations may be added, removed, or modified in the present disclosure by those skilled in the art without departing from the scope of the present disclosure.

INDUSTRIAL APPLICABILITY

The present disclosure can be widely used for the method of measuring the slope of a drainpipe.

The invention claimed is:

1. A method of measuring a slope of a drainpipe while moving through the drainpipe, the method comprising the following steps:
   a) continuously measuring a slope of a pipe using a slope sensor disposed in a vehicle when the vehicle moves;
   b) measuring distances to a ceiling of the pipe in real time through non-contact sensors disposed at four positions, that is, at both sides of front and rear portions the vehicle, the step b) being performed simultaneously with the step a); and
   c) calculating slope differences, which are the degrees of inclination to the front, rear, left, and right using trigonometry and then correcting the slope by reflecting the slope differences to the slope measured in the step a), when there are differences in the distances measured in step b).

2. The method of claim 1 further comprising the following steps:
   d1) continuously taking images of an inside of the pipe using a camera on the vehicle and determining whether a shadow of a center of the pipe is a circle or not in an image frame in the taken image information using an image recognition technique, the step d1) being performed simultaneously with the step a); and
   d2) filtering out the slope measured at the point corresponding to a non-circle in step a) from entire slope data when it is determined that the shadow of the center of the pipe is not a circle in step d1).

3. The method of claim 2, wherein the images continuously taken in the step d1) are converted into a gray scale and then whether the shadow of the center of the pipe is a circle in an image frame of the gray scale is determined.

4. The method of claim 1, further comprising the following steps:
- e1) continuously taking images of the inside of the pipe using a camera on the vehicle, creating a panorama image by spreading the obtained image information on a plane using an image recognition technique, and then calculating an average RGB density of the panorama image, the step e1) being performed simultaneously with the step a);
- e2) searching out specific sections of which the RGB densities exceed a predetermined range from the average RGB density of the entire panorama image from the panorama image created in step e1); and
- e3) when an abnormal section is found in step e2), filtering out the slope measured at the point corresponding to the abnormal section in step a) from entire effective slope data.

5. The method of claim 1, wherein the vehicle is a self-propelled vehicle that is driven by wheels, or a drone.

* * * * *